United States Patent
Zhu

(10) Patent No.: US 6,509,423 B1
(45) Date of Patent: Jan. 21, 2003

(54) SILICONE COMPOSITION AND CURED SILICONE PRODUCT

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/934,215

(22) Filed: Aug. 21, 2001

(51) Int. Cl.$^7$ .............................. C08L 83/05; C08L 83/07
(52) U.S. Cl. ...................... 525/478; 525/477; 528/15; 524/493
(58) Field of Search ................................ 525/477, 478; 528/15; 524/493

(56) References Cited

U.S. PATENT DOCUMENTS 5,747,608 A     5/1998    Katsoulis et al.
6,310,146 B1 * 10/2001   Katsoulis et al.

FOREIGN PATENT DOCUMENTS

GB      1 065 248 A1    1/2001

* cited by examiner

Primary Examiner—Robert Dawson
Assistant Examiner—Kuo-Liang Peng
(74) Attorney, Agent, or Firm—Larry A. Milco

(57) ABSTRACT

A silicone resin composition, comprising (A) 100 parts by weight of an organopolysiloxane resin containing an average of greater than two alkenyl groups per molecule and having less than 1.5 mole % percent of silicon-bonded hydroxy groups, (B) an organohydrogensilane in an amount sufficient to cure the composition, (C) an effective amount of an inorganic filler; and (D) a catalytic amount of a hydrosilylation catalyst. The present invention is further directed to a cured silicone product comprising a reaction product of the above-described composition. A cured silicone product comprising a reaction product of the silicone resin composition and a multi-part silicone composition comprising components (A) through (D) in two or more parts, provided components (A), (B), and (D) are not present in the same part.

20 Claims, 1 Drawing Sheet

SILICONE COMPOSITION AND CURED SILICONE PRODUCT

FIELD OF THE INVENTION

The present invention relates to a silicone composition and more particularly to a hydrosilylation addition-curable silicone resin composition comprising a silicone resin, an organohydrogensilane, and an inorganic filler. The present invention further relates to a cured silicone product formed from the composition.

BACKGROUND OF THE INVENTION

Silicones are useful in a variety of applications by virtue of their unique combination of properties, including high thermal stability, good moisture resistance, excellent flexibility, high ionic purity, low alpha particle emissions, and good adhesion to various substrates. For example, silicones are widely used in the automotive, electronic, construction, appliance, and aerospace industries.

Silicone compositions comprising an organopolysiloxane resin organohydrogensiloxane, and hydrosilylation catalyst are known in the art. The organopolysiloxane resin is typically a copolymer containing T and/or Q siloxane units in combination with M and/or D units. However, such compositions cure to form silicone products having relatively low fracture toughness and high coefficients of thermal expansion, rendering them unsatisfactory for certain applications, such as attachment of heat sinks to semiconductor chips and semiconductor chips to substrates. During thermal cycling, stresses develop in the silicone product due to differences in the coefficients of thermal expansion between the substrate materials and the silicone. Thermally induced stresses can weaken or fracture the bond joint, limiting the useful service life of a device.

Various approaches to improving the fracture toughness of cured silicone resins are reported in the literature. For example, U.S. Pat. No. 5,747,608 to Katsoulis et al. discloses a rubber-modified rigid silicone resin comprising a copolymerized reaction product of an organosilicone resin and a silicone rubber. The '608 patent discloses, inter alia, addition-curable silicone resin compositions.

Also, European Patent Application EP 1 065 248 A1 to Katsoulis et al. discloses a hydrosilylation reaction curable composition comprising a silsesquioxane copolymer, a silyl-terminated hydrocarbon, and a hydrosilylation reaction catalyst. The '248 application also teaches that the cured silsesquioxane resin has improved strength and toughness without significant loss of modulus.

Inorganic fillers such as silica and alumina are typically added to silicone compositions to reduce the coefficient of thermal expansion of cured products. Such fillers have very low coefficients of thermal expansion compared to the cured silicone products. However, the addition of moderate to high amounts of inorganic fillers to conventional silicone resin compositions can significantly reduce the fracture toughness of the cured resins.

Consequently, there is a need for a hydrosilylation addition-curable silicone composition that cures to form a silicone product having a low coefficient of thermal expansion and high fracture toughness.

SUMMARY OF THE INVENTION

The present invention is directed to a silicone composition comprising:

(A) 100 parts by weight of an organopolysiloxane resin containing an average of greater than two alkenyl groups per molecule and having less than 1.5 mol % of silicon-bonded hydroxy groups, wherein the resin is selected from:

(a) a copolymer consisting essentially of $R^2_3SiO_{1/2}$ units and $R^1SiO_{3/2}$ units, wherein the mole ratio of $R^2_3SiO_{1/2}$ units to $R^1SiO_{3/2}$ is from 0.05 to 3.0, (b) a copolymer consisting essentially of $R^2_3SiO_{1/2}$ units, $R^1SiO_{3/2}$ units, and $SiO_{4/2}$ units, wherein the mole ratio of $R^2_3SiO_{1/2}$ units to $R^1SiO_{3/2}$ is from 0.05 to 3.0 and the mole ratio of $R^2_3SiO_{1/2}$ and $R^1SiO_{3/2}$ units combined to $SiO_{4/2}$ units is from 4 to 99, (c) a copolymer consisting essentially of $R^2_3SiO_{1/2}$ units, $R^1SiO_{3/2}$ units, and $R^2_2SiO_{2/2}$ units, wherein the mole ratio of $R^2_3SiO_{1/2}$ units to $R^1SiO_{3/2}$ units is from 0.05 to 3.0 and the mole ratio of $R^2_3SiO_{1/2}$ units and $R^1_2SiO_{3/2}$ units combined to $R^2_2SiO_{2/2}$ units is from 0.5 to 99; and (d) a copolymer consisting essentially of $R^2_2SiO_{2/2}$ units and $R^1SiO_{3/2}$ units, wherein the mole ratio of $R^2_2SiO_{2/2}$ units to $R^1SiO_{3/2}$ units is from 0.2 to 4.0; wherein $R^1$ is a hydrocarbyl group free of aliphatic unsaturation and $R^2$ is selected from $R^1$ and alkenyl;

(B) an organohydrogensilane in an amount sufficient to cure the composition, the organohydrogensilane having the formula:

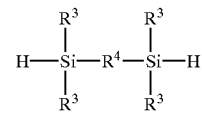

wherein $R^3$ is a hydrocarbyl group free of aliphatic unsaturation and $R^4$ is a hydrocarbylene group having a formula selected from:

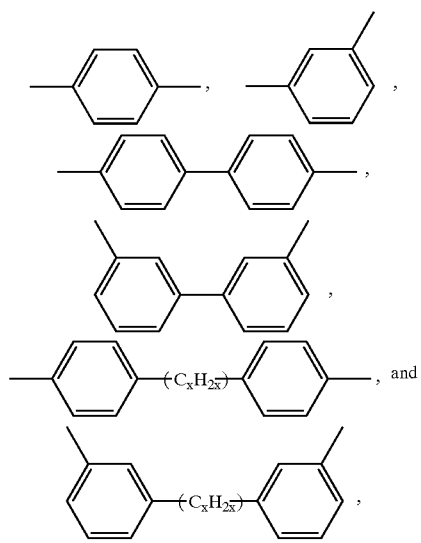

wherein x is from 1 to 6;

(C) an effective amount of an inorganic filler; and (D) a catalytic amount of a hydrosilylation catalyst.

The present invention is further directed to a cured silicone product comprising a reaction product of the above-described composition.

The present invention is still further directed to a multi-part silicone composition comprising components (A) through (D) in two or more parts, provided components (A), (B), and (D) are not present in the same part.

The silicone composition of the present invention has numerous advantages, including low VOC (volatile organic compound) content and adjustable cure. Moreover, the silicone composition cures to form a silicone product having low CTE and superior fracture toughness.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

DETAILED DESCRIPTION OF THE INVENTION

Figure 1:
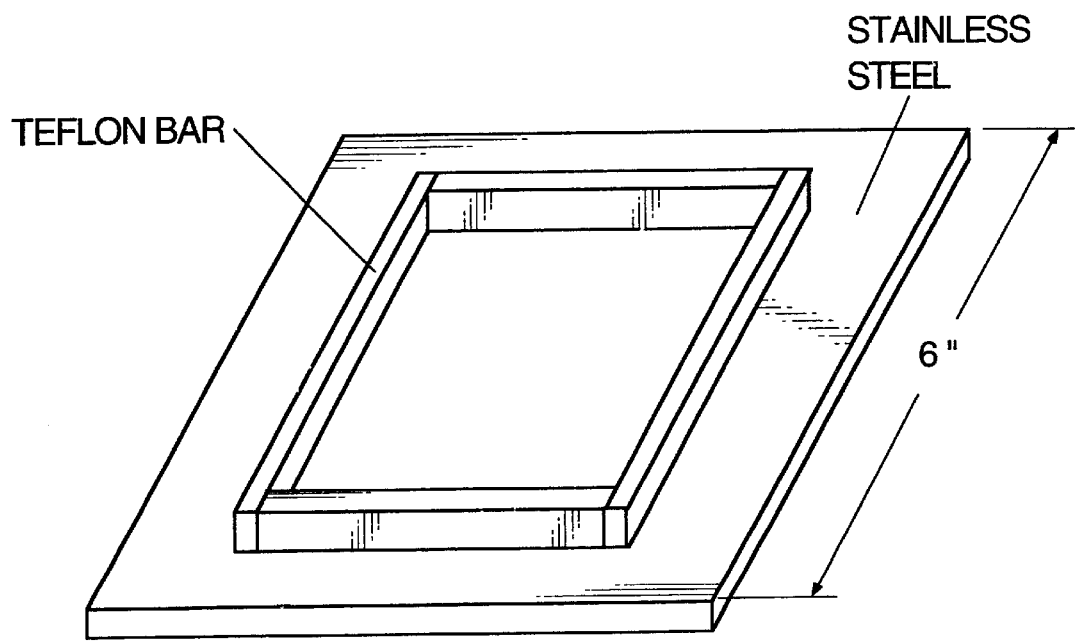
FIG. 1 shows a mold for preparing a cured silicone product.

A silicone resin composition according to the present invention comprises:

(A) 100 parts by weight of an organopolysiloxane resin containing an average of greater than two alkenyl groups per molecule and having less than 1.5 mol % of silicon-bonded hydroxy groups, wherein the resin is selected from:
  (a) a copolymer consisting essentially of $R^2_3SiO_{1/2}$ units and $R^1SiO_{3/2}$ units, wherein the mole ratio of $R^2_3SiO_{1/2}$ units to $R^1SiO_{3/2}$ is from 0.05 to 3.0,
  (b) a copolymer consisting essentially of $R^2_3SiO_{1/2}$ units, $R^1SiO_{3/2}$ units, and $SiO_{4/2}$ units, wherein the mole ratio of $R^2_3SiO_{1/2}$ units to $R^1SiO_{3/2}$ is from 0.05 to 3.0 and the mole ratio of $R^2_3SiO_{1/2}$ and $R^1SiO_{3/2}$ units combined to $SiO_{4/2}$ units is from 4 to 99,
  (c) a copolymer consisting essentially of $R^2_3SiO_{1/2}$ units, $R^1SiO_{3/2}$ units, and $R^2_2SiO_{2/2}$ units, wherein the mole ratio of $R^2_3SiO_{1/2}$ units to $R^1SiO_{3/2}$ units is from 0.05 to 3.0 and the mole ratio of $R^2_3SiO_{1/2}$ units and $R^1SiO_{3/2}$ units combined to $R^2_2SiO_{2/2}$ units is from 0.5 to 99; and
  (d) a copolymer consisting essentially of $R^2_2SiO_{2/2}$ units and $R^1SiO_{3/2}$ units, wherein the mole ratio of $R^2_2SiO_{2/2}$ units to $R^1SiO_{3/2}$ units is from 0.2 to 4.0; wherein $R^1$ is a hydrocarbyl group free of aliphatic unsaturation and $R^2$ is selected from $R^1$ and alkenyl;

(B) an organohydrogensilane in an amount sufficient to cure the composition, the organohydrogensilane having the formula:

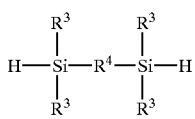

wherein $R^3$ is a hydrocarbyl group free of aliphatic unsaturation and $R^4$ is a hydrocarbylene group having a formula selected from:

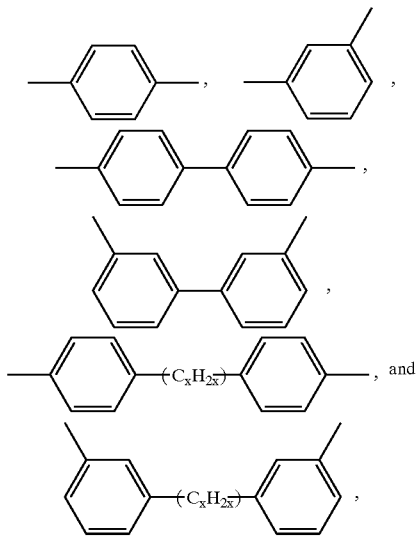

wherein x is from 1 to 6;

(C) an effective amount of an inorganic filler; and (D) a catalytic amount of a hydrosilylation catalyst.

Component (A) is at least one organopolysiloxane resin containing an average of greater than two alkenyl groups per molecule and having less than 1.5 mol % of silicon-bonded hydroxy groups, wherein the resin is selected from (a) a copolymer consisting essentially of $R^2_3SiO_{1/2}$ units and $R^1SiO_{3/2}$ units, wherein the mole ratio of $R^2_3SiO_{1/2}$ units to $R^1SiO_{3/2}$ is from 0.05 to 3.0, (b) a copolymer consisting essentially of $R^2_3SiO_{1/2}$ units, $R^1SiO_{3/2}$ units, and $SiO_{4/2}$ units, wherein the mole ratio of $R^2_3SiO_{1/2}$ units to $R^1SiO_{3/2}$ is from 0.05 to 3.0 and the mole ratio of $R^2_3SiO_{1/2}$ and $R^1SiO_{3/2}$ units combined to $SiO_{4/2}$ units is from 4 to 99, (c) a copolymer consisting essentially of $R^2_3SiO_{1/2}$ units, $R^1SiO_{3/2}$ units, and $R^2_2SiO_{2/2}$ units, wherein the mole ratio of $R^2_3SiO_{1/2}$ units to $R^1SiO_{3/2}$ units is from 0.05 to 3.0 and the mole ratio of $R^2_3SiO_{1/2}$ units and $R^1_2SiO_{3/2}$ units combined to $R^2_2SiO_{2/2}$ units is from 0.5 to 99; and (d) a copolymer consisting essentially of $R^2_2SiO_{2/2}$ units and $R^1SiO_{3/2}$ units, wherein the mole ratio of $R^2_2SiO_{2/2}$ units to $R^1SiO_{3/2}$ units is from 0.2 to 4.0; wherein $R^1$ is a hydrocarbyl group free of aliphatic unsaturation and $R^2$ is selected from $R^1$ and alkenyl.

The hydrocarbyl groups represented by $R^1$ and $R^2$ are free of aliphatic unsaturation. As used herein, the term "free of aliphatic unsaturation" means that the hydrocarbyl groups do not contain an aliphatic carbon-carbon double bond or carbon-carbon triple bond. These hydrocarbyl groups typically have from 1 to about 20 carbon atoms and preferably have from 1 to 10 carbon atoms. Examples of hydrocarbyl groups represented by $R^1$ and $R^2$ include, but are not limited to, alkyl such as methyl, ethyl, propyl, pentyl, octyl, undecyl, and octadecyl; cycloalkyl such as cylcoalkyl; aryl such as phenyl, tolyl, xylyl, benzyl, and 2-phenylethyl. Preferably, at least 50 percent, and more preferably at least 80%, of the organic groups free of aliphatic unsaturation in the organopolysiloxane are selected from methyl and phenyl.

The alkenyl groups represented by $R^2$, which may be the same or different, typically have from 2 to about 10 carbon atoms and are exemplified by, but not limited to, vinyl, allyl, butenyl, and hexenyl. The alkenyl groups may be located at terminal, pendant, or both terminal and pendant positions.

The organopolysiloxane typically has weight-average molecular weight of from 1,000–500,000 and a polydispersity of from 1 to 3, where molecular weight is determined by gel permeation chromatography employing a low angle laser light scattering detector.

The organopolysiloxane resin contains less than 1.5 mol % of silicon-bonded hydroxy groups, as determined by $^{29}Si$ NMR. The mole percent of silicon-bonded hydroxy groups in the resin is defined here as the ratio of the number of moles of siloxane units containing silicon-bonded hydroxy groups in the resin to the total number of moles of siloxane units in the resin, multiplied by 100.

Examples of organopolysiloxane resins include, but are not limited to, those having the following formulae: $(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, and $(Vi_2MeSiO_{1/2})_{0.15}(ViMe_2SiO_{1/2})_{0.1}(PhSiO_{3/2})0.75$, where Me is methyl and Vi is vinyl.

Component (A) can be a single organopolysiloxane resin or a mixture comprising two or more organopolysiloxane resins that differ in at least one of the following properties: structure, weight-average molecular weight, number average molecular weight, polydispersity, and siloxane units.

Methods of preparing organopolysiloxane resins are well known in the art; many of these resins are commercially available. Organopolysiloxane resins are typically prepared by cohydrolyzing the appropriate mixture of chlorosilane precursors in an organic solvent, such as toluene. For example, a copolymer consisting essentially of $R^2_3SiO_{1/2}$ units and $R^1SiO_{3/2}$ units, component (A)(a), can be prepared by cohydrolyzing a compound having the formula $R^2_3SiCl$ and a compound having the formula $R^1SiCl_3$ in toluene, where $R^1$ and $R^2$ are as defined above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Components (A)(b), (A)(c), and (A)(d) can be similarly prepared by cohydrolysis and condensation of $R^2_3SiCl$, $R^1SiCl_3$, and $SiCl_4$; $R^2_3SiCl$, $R^1SiCl_3$, and $R^2SiCl_2$; and $R^2SiCl_2$ and $R^1SiCl_3$; respectively. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Component (B) is at least one organohydrogensilane in an amount sufficient to cure the composition, the organohydrogensilane having the formula:

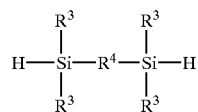

wherein $R^3$ is a hydrocarbyl group free of aliphatic unsaturation and $R^4$ is a hydrocarbylene group having a formula selected from:

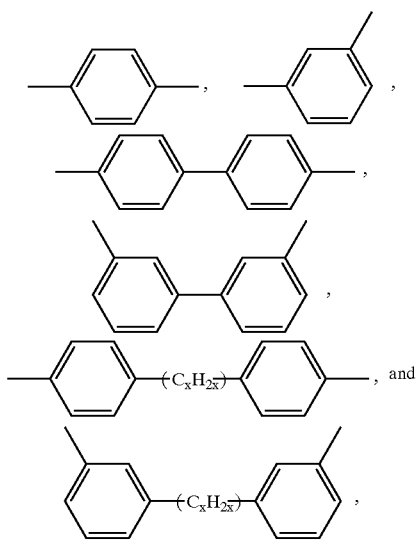

wherein x is from 1 to 6.

Hydrocarbyl groups represented by $R^3$ are free of aliphatic unsaturation. These hydrocarbyl groups typically have from 1 to about 10 carbon atoms and preferably have from 1 to 6 carbon atoms. Examples of hydrocarbyl groups represented by $R^3$ include, but are not limited to, alkyl such as methyl, ethyl, propyl, pentyl; and phenyl. Preferably, at least 50 percent, and more preferably at least 80%, of the organic groups represented by $R^3$ in the organohydrogensilane are methyl.

Examples of organohydrogensilanes include, but are not limited to, compounds having the following formulae:

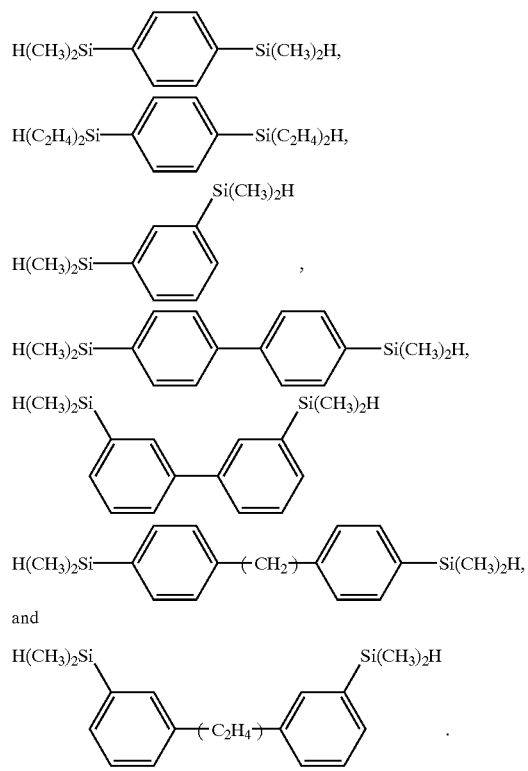

Component (B) can be a single organohydrogensilane or a mixture comprising two or more organohydrogensilanes that differ in at least one of the following properties: structure, average molecular weight, viscosity, and silane units.

The concentration of component (B) is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is sufficient to provide typically from 0.5 to 2 silicon-bonded hydrogen atoms, preferably from 0.8 to 1.8 silicon-bonded hydrogen atoms, and more preferably from 1.0 to 1.2 silicon-bonded hydrogen atoms, per alkenyl group in component (A).

The organohydrogensilanes of the present invention can be prepared using well-known methods of preparing organohydrogensilanes, such as the reaction of Grignard reagents with aryl halides. For example, the organohydrogensilanes having the formula $HR^3_2Si-R^4-SiR^3_2H$ can be prepared by treating an aryl dihalide having the formula $R^4X_2$ with magnesium in ether to produce the corresponding Grignard reagent and then treating the Grignard reagent with a chlorosilane having the formula $HR^3_2SiCl$, where $R^3$ and $R^4$ are as defined above. This method is illustrated by the Grignard synthesis of 1,4-bis(dimethylsilyl)benzene in Example 2 below.

Component (C) is at least one inorganic filler. Component (C) can be any inorganic filler typically employed in hydrosilylation addition-curable silicone compositions to modify the rheological properties of the composition, the cost of the composition, or to modify the mechanical, electrical, chemical, or thermal properties of the cured product.

The inorganic filler typically has a specific surface area of from 0.1 to 300 $m^2/g$ and preferably has a surface area of from 0.1 to 50 $m^2/g$, as determined using the Brunauer-Emmett-Teller (B.E.T.) method.

The inorganic filler comprises particles having an average size typically from 0.1 to 500 $\mu$m and preferably from 0.1 to 100 $\mu$m.

Although the shape of the inorganic filler particles is not critical, particles having a spherical shape are preferred because they generally impart a smaller increase in viscosity to the silicone composition than particles having other shapes.

The filler has a pH value at room temperature (15 to 25° C.) typically from 3 to 9 and preferably from 6 to 9. The pH of a filler can be determined by measuring the pH value of a slurry of 10 g of the filler in 10 mL of distilled water, as exemplified in ASTM D 4972. When the pH of the filler is less than about 3, the cured silicone product typically exhibits reduced thermal stability. When the pH of the filler is greater than about 9, the silicone composition typically becomes unstable upon storage and/or the cured silicone product exhibits reduced thermal stability.

The filler has a water (moisture) content typically less than 2% by weight and preferably less than 1% by weight. The water content of a filler can be determined by measuring the weight loss on drying the filler at 110° C., as exemplified in ASTM D 2216. When the water content is greater than about 2% by weight, the organohydrogensilane and water can react in the presence of the hydrosilylation catalyst. This reaction consumes the organohydrogensiloxane required for curing the silicone composition and produces hydrogen gas, which may cause formation of voids in the cured silicone product.

Examples of inorganic fillers include, but are not limited to, natural silicas such as crystalline silica, ground crystalline silica, and diatomaceous silica; synthetic silicas such as fused silica, silica gel, pyrogenic silica, and precipitated silica; silicates such as mica, wollastonite, feldspar, and nepheline syenite; metal oxides such as aluminum oxide, titanium dioxide, magnesium oxide, ferric oxide, beryllium oxide, chromium oxide, titanium oxide, and zinc oxide; metal nitrides such as boron nitride, silicon nitride, and aluminum nitride, metal carbides such as boron carbide, titanium carbide, and silicon carbide; carbon black; alkaline earth metal carbonates such as calcium carbonate; alkaline earth metal sulfates such as calcium sulfate, magnesium sulfate, and barium sulfate; molybdenum disulfate; zinc sulfate; kaolin; talc; glass fiber; glass beads such as hollow glass microspheres and solid glass microspheres; aluminum trihydrate; asbestos; and metallic powders such as aluminum, copper, nickel, iron, and silver powders. Preferably, the inorganic filler is fused silica.

Component (C) can also be a treated inorganic filler, prepared by treating the surfaces of the aforementioned inorganic fillers with an organosilicon compound. The organosilicon compound can be any of the organosilicon compounds typically used to treat silica fillers. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane, hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane.

Component (C) can be a single inorganic filler as described above or a mixture of two or more such fillers that differ in at least one property, such as surface area, surface treatment, particle size, density, and particle shape.

Component (C) is present in an effective amount in the silicone composition. As used herein, the term "effective amount" means that the concentration of component (C) is such that the silicone composition cures to form a product having reduced coefficient of thermal expansion compared with the same composition lacking only the inorganic filler. The concentration of component (C) is such that the cured silicone product has a coefficient of thermal expansion typically from $30\times10^{-6}$ to $90\times10^{-6}$ $\mu$m/m/°C., as determined using the methods in the Examples below. The exact concentration of component (C) depends on the desired thermal properties, surface area of the filler, density of the filler, shape of the filler particles, surface treatment of the filler, and nature of the other components in the silicone composition.

The concentration of component (C) is typically from 25 to 900 parts by weight and preferably from 40 to 400 parts by weight, per 100 parts by weight of component (A) However, as the surface area of the inorganic filler increases in the range from 0.1 to 300 $m^2/g$, it may be necessary to decrease the concentration of the filler in the above-stated range to obtain a processable composition. When the concentration of component (C) is less than about 25 parts by weight, the cured silicone product does not exhibit a significant reduction in coefficient of thermal expansion compared with the silicone product produced from the same composition absent the inorganic filler. When the concentration of component (C) is greater than about 900 parts by weight, the silicone composition has a very high viscosity and cures to form a brittle product. The effective amount of component (D) can be determined by routine experimentation using the methods in the Examples below.

Component (D) is at least one hydrosilylation catalyst that promotes the addition reaction of component (A) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein; and U.S. Pat. No. 5,017,654.

Component (D) can be a single hydrosilylation catalyst or a mixture comprising two or more different catalysts that differ in at least one property, such as structure, form, platinum group metal, complexing ligand, and thermoplastic resin.

The concentration of component (D) is sufficient to catalyze the addition reaction of components (A) with component (B). Typically, the concentration of component (D) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

The silicone composition can comprise additional ingredients, provided the ingredient does not prevent the composition from curing to form a silicone resin having low CTE and high fracture toughness, as described above. Examples of additional ingredients include, but are not limited to, hydrosilylation catalyst inhibitors; adhesion promoters, such as the adhesion promoters taught in U.S. Pat. Nos. 4,087,585 and 5,194,649; dyes; pigments; antioxidants; heat stabilizers; UV stabilizers; flame retardants; flow control additives; and organic solvents.

Examples of hydrosilylation catalyst inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-phenyl-3-butyn-2-ol; maleates and fumarates, such as the well known dialkyl, dialkenyl, and dialkoxyalkyl fumarates and maleates; and cyclovinylsiloxanes.

Examples of organic solvents include saturated hydrocarbons such as pentane, hexane, and heptane; aromatic hydrocarbons such as benzene, toluene and xylene; mineral spirits; halohydrocarbons such as dichloromethane, chloroform, and 1,1,1-trichloroethane; esters such as ethyl acetate; ketones, such as acetone, methyl ethyl ketone, and methyl isobutyl ketone; and mixtures of such solvents.

The silicone composition can be a one-part composition comprising components (A) through (D) in a single part or, alternatively, a multi-part composition comprising components (A) through (D) in two or more parts, provided components (A), (B), and (D) are not present in the same part. For example, a multi-part silicone composition can comprise a first part containing a portion of component (A) and a potion of component (C), and all of component (D), and a second part containing the remaining portions of components (A) and (C) and all of component (B).

The one-part silicone composition is typically prepared by combining components (A) through (D) and any optional ingredients in the stated proportions at ambient temperature with or without the aid of an organic solvent. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

The silicone composition can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; epoxies; polyesters; polycarbonates; polyphenylene oxides; ceramics; and glass.

A cured silicone product according to the present invention comprises a reaction product of the silicone composition containing components (A) through (D), described above. The silicone composition can be cured at a temperature from about room temperature to about 250° C., preferably from about room temperature to about 200° C., and more preferably from about room temperature to about 150° C., for a suitable length of time. For example, the silicone composition typically cures in less than about one hour at 150° C.

The silicone composition of the present invention has numerous advantages, including low VOC (volatile organic compound) content and adjustable cure. Moreover, the silicone composition cures to form a silicone product having low CTE and superior fracture toughness.

The silicone composition of the present invention, which does not require an organic solvent for many applications, has a very low VOC content. Consequently, the present silicone composition avoids the health, safety, and environmental hazards associated with solvent-borne silicone compositions. In addition, the solventless composition of the present invention typically undergoes less shrinkage during curing than solvent-borne silicone compositions.

Additionally, the silicone composition of the present invention cures rapidly at temperatures from room temperature to moderately elevated temperatures without the formation of detectable byproducts. In fact, the cure rate of the silicone composition can be conveniently adjusted by regulating the concentration of catalyst and/or optional inhibitor.

Importantly, the silicone composition cures to form a silicone resin having low CTE and unexpectedly high fracture toughness compared with a similar composition lacking the inorganic filler, component (C), and/or containing an organohydrogensiloxane in place of component (B). In fact, the fracture toughness of the cured silicone product of the present invention is typically at least 75% of the fracture toughness of the cured silicone resin prepared from the same composition absent the filler.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

EXAMPLES

The following examples are presented to further illustrate the silicone composition of this invention, but are not to be considered as limiting the invention, which is delineated in the appended claims. Unless otherwise noted, all parts and percentages reported in the examples are by weight.

Preparation of Test Specimens for Measurement of Flexural Strength and Flexural Modulus The silicone composition was poured into a rectangular mold measuring 5.0×5.0×0.125 in. (12.7×12.7×0.318 cm) and constructed of Teflon bars and a stainless steel plate (FIG. 1). The filled mold was heated in a vacuum oven at 50° C. under a pressure of 50 mm Hg (6,666 Pa) for about ten minutes to degas the composition. After cooling to room temperature, the mold was placed in a forced air oven and subjected to the following heating cycle: 60° C. for 24 hours, 100° C. for 2 hours, 160° C. for 4 hours, 200° C. for 2 hours, and 260° C. for 6 hours. The mold was allowed to cool to room temperature and the cured silicone sample was removed.

The cured silicone sample was cut with a band saw into four identical test specimens, each measuring 2.0×0.5×0.125 in. (5.1×1.3×0.318 cm). The test specimens were polished by hand using, in order, sand papers having grit numbers of 320, 500, 800, 1200, 2400, and 4000. The test specimens were further polished by hand using, in order, aqueous dispersions of alumina having particles sizes of 1, 0.1, and 0.05 $\mu$m. The polished specimens were dried at 80° C. overnight and then maintained at room temperature for at least 24 hours before testing.

Measurement of Flexural Strength and Flexural Modulus

The flexural properties of a silicone test specimen were determined using an Instron 8562 Loadframe equipped with a 1000 N loadcell. Measurements were performed at 21° C. using a three-point loading system as described in ASTM D 790-00.

Load-deflection curves were plotted to determine the flexural strength and flexural modulus of the test specimen. The flexural strength was calculated using the following equation:

$$\sigma_{fM} = 3PL/2bd^2$$

where:
$\sigma_{fM}$=flexural strength (maximum stress in the outer surface at the midpoint), MPa,
P=maximum load on the load-deflection curve, N,
L=support span, mm,
b=width of beam tested, mm, and
d=depth of beam tested, mm.

The Flexural modulus, also referred to as "modulus of elasticity," of a silicone test specimen was determined by drawing a tangent to the steepest initial straight-line portion of the load-deflection (stress-strain) curve. The slope of the tangent was taken as the flexural modulus.

Reported values for flexural strength and flexural modulus, expressed in units of MPa and GPa, respectively, represent the average of four measurements performed on identically prepared test specimens.

Preparation of Test Specimens for Measurement of Fracture Toughness

The silicone composition was poured into a rectangular mold measuring 5.0×5.0×0.125 in. (12.7×12.7×0.318 cm) and constructed of Teflon bars and a stainless steel plate (FIG. 1). The filled mold was heated in a vacuum oven at 50° C. under a pressure of 50 mm Hg (6,666 Pa) for about ten minutes to degas the composition. After cooling to room temperature, the mold was placed in a forced air oven and subjected to the following heating cycle: 60° C. for 24 hours, 100° C. for 2 hours, 160° C. for 4 hours, 200° C. for 2 hours, and 260° C. for 6 hours. The mold was allowed to cool to room temperature and the cured silicone sample was removed.

The cured silicone sample was cut with a band saw into six identical test specimens, each measuring 2.0×0.375×0.125 in. (5.1×0.953×0.318 cm). The test specimens were polished by hand using, in order, sand papers having grit numbers of 320, 500, 800, 1200, 2400, and 4000. The test specimens were further polished by hand using, in order, aqueous dispersions of alumina having particles sizes of 1, 0.1, and 0.05 $\mu$m. The polished specimens were dried at 80° C. overnight and then maintained at room temperature for at least 24 hours.

Figure 2:
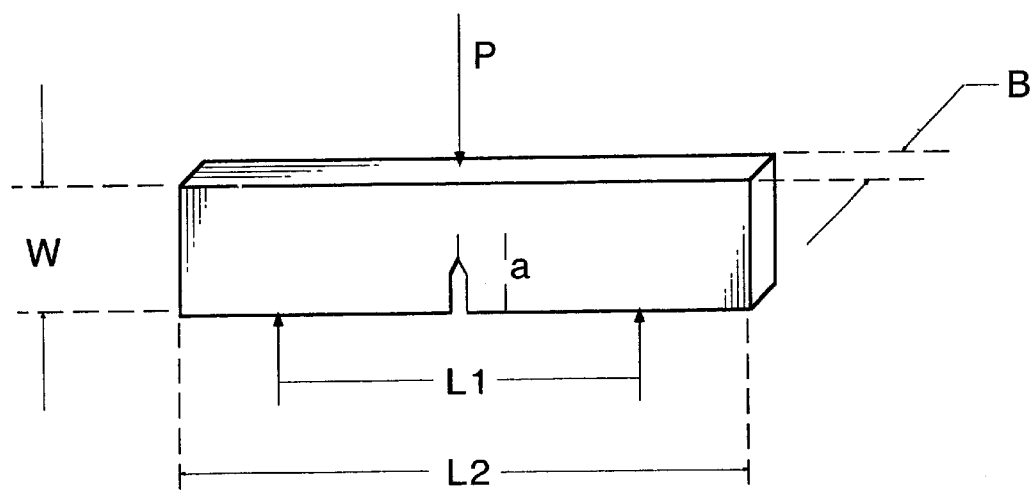
FIG. 2 shows a test specimen for determining fracture toughness of a cured silicone product.

A notch having a depth of 0.1 in. (0.254 cm) was cut in the specimen at the midpoint of each specimen by machining. Subsequently, a natural crack extending from the root of the notch to about half of the specimen width was generated by inserting a fresh razor blade in the notch and gently tapping on the blade. The configuration of the final test specimen is shown in FIG. 2, where P represents the maximum load that the specimen is able to sustain, a represents crack length, W represents a specimen width of 0.375 in. (0.953 cm), B represents specimen thickness of 0.157 in. (0.399 cm), L1 represents a support span of 1.5 in. (3.81 cm), and L2 represents a specimen length of 2.0 in. (5.08 cm).

Measurement of Fracture Toughness

The plane-strain fracture toughness, $K_{IC}$, of a silicone test specimen was determined using an Instron 8562 Loadframe equipped with a 1000 N loadcell. Measurements were performed at 21° C. using a three-point bending system as described in ASTM D 5045-99. The displacement rate of the test was 10 mm/minute. For the geometry and loading conditions shown in FIG. 2 and a support span to specimen width ratio (L1/W) equal to 4, fracture toughness was calculated using the following equation:

$$K_{IC} = (P/(BW^{1/2}))f(x)$$

where:
$K_{IC}$=fracture toughness, MPam$^{1/2}$,
P=maximum load, kN,
B=is specimen thickness, cm,
W=specimen width, cm,
f(x)=6x$^{1/2}$(1.99−x(1−x)(2.15−3.93x+2.7x$^2$))/((1+2x)(1−x)$^{3/2}$), and
x=a/W where a is crack length in cm.
The crack length, a, was selected such that 0.45<a/W<0.55.

Preparation of Test Specimens for CTE and Tg Measurements

The silicone composition was poured into a rectangular mold measuring 5.0×5.0×0.125 in. (12.7×12.7×0.318 cm) and constructed of Teflon bars and a stainless steel plate (FIG. 1). The filled mold was heated in a vacuum oven at 50° C. under a pressure of 50 mm Hg (6,666 Pa) for about ten minutes to degas the composition. After cooling to room temperature, the mold was placed in a forced air oven and subjected to the following heating cycle: 60° C. for 24 hours, 100° C. for 2 hours, 160° C. for 4 hours, 200° C. for 2 hours, and 260° C. for 6 hours. The mold was allowed to cool to room temperature and the cured silicone sample was removed.

The cured silicone sample was cut with a band saw into six identical test specimens, each measuring 1×3×20 mm. The test specimens were polished by hand using, in order, sand papers having grit numbers of 320, 500, 800, 1200, 2400, and 4000. The test specimens were further polished by hand using, in order, aqueous dispersions of alumina having particles sizes of 1, 0.1, and 0.05 μm. The polished specimens were dried at 80° C. overnight and then maintained at room temperature for at least 24 hours before testing.

Measurement of Coefficient of Linear Thermal Expansion (CTE) and Glass Transition Temperature ($T_g$)

The CTE of a silicone test specimen was determined using a TA Instruments 2980 Dynamic Mechanical Analyzer (DMA). The test specimen was mounted in a tension mode and equilibrated at −150° C. At a test frequency of 1 Hz, the temperature of the specimen was increased at a rate of 4° C./step to 400° C. The length of the specimen was monitored as a function of temperature and the linear thermal expansion coefficient was obtained by dividing the change in length observed between −50 and 150° C. by the difference in temperature. The reported values for CTE are expressed in units of μm/m°C. The $T_g$ of the same test specimen was then determined by subjecting the specimen to a sinusoidal strain and measuring tensile force as a function of input strain and temperature, from which the storage modulus and the loss modulus were obtained. The ratio of the loss modulus to the storage modulus, tan δ, was calculated. The temperature (°C.) corresponding to the maximum value of tan δ was taken as the Tg.

Reagents

The following chemical substances were used in the Examples:

Resin Solution A: a solution of 79.5 percent by weight of an organopolysiloxane resin in toluene, wherein the resin consists essentially of $CH_2=CHMe_2SiO_{1/2}$ units and $PhSiO_{3/2}$ units, wherein the mole ratio of $CH_2=CHMe_2SiO_{1/2}$ units to $PhSiO_{3/2}$ units is about 0.33, and the resin has a weight-average molecular weight of about 1700, has a number-average molecular weight of about 1300, and contains about 1 mol % of silicon-bonded hydroxy groups. Resin A was prepared as described in Example 1.

Resin Solution B: a solution of 75 percent by weight of an organopolysiloxane resin in toluene, wherein the resin consists essentially of $CH_2=CHMe_2SiO_{1/2}$ units and $PhSiO_{3/2}$ units, wherein the mole ratio of $CH_2=CHMe_2SiO_{1/2}$ units to $PhSiO_{3/2}$ units is about 0.33, and the resin has a weight-average molecular weight of about 1700, has a number-average molecular weight of about 1300, and contains about 1 mol % of silicon-bonded hydroxy groups. Resin A was prepared as described in Example 1.

Crosslinking Agent A: 1,4-bis(dimethylsilyl)benzene having a purity >96%, as determined by $^{29}Si$ NMR. Crosslinking Agent A was prepared as described in Example 2.

Crosslinking Agent B: an organohydrogensiloxane having the formula: $PhSi(OSiMe_2H)_3$.

Filler: a spherical fused silica sold under the name SIL-STAR LE-02S by Nippon Chemical Industrial Company, Ltd. (Fukushima, Japan). The filler has a surface area of 5.11 $m^2/g$, water content of 0.02% by weight, particle size distribution of 2.2 μm (50%), ≦3 μm (87.1%), >20 μm (0.0%), and a maximum particles size of 6.5 μm.

Catalyst: a mixture comprising a platinum(IV) complex of 1,1-diethenyl-1,1,3,3-tetramethyldisiloxane and 1-ethynylcylcohexan-1-ol in a mole ratio of 1:20, and toluene, wherein the mixture has a platinum metal concentration of 1000 ppm.

Example 1

This example demonstrates the preparation of the Resin used in Examples 3–6 and Comparative Examples 1–3. Trimethoxyphenylsilane (200 g), tetramethyldivinyldisiloxane (38.7 g), deionized water (65.5 g), toluene (256 g), and trifluoromethanesulfonic acid (1.7 g) were combined in a 3-necked round-bottom flask equipped with a Dean-Stark Trap and thermometer. The mixture was heated at 60 to 65° C. for 2 hours. The mixture was then heated to reflux and water and methanol were removed using a Dean-Stark trap. When the temperature of the mixture reached 80° C. and the removal of water and methanol was complete, the mixture was cooled to less than 50° C. Calcium carbonate (3.3 g) and water (about 1 g) were added to the mixture. The mixture was stirred at room temperature for 2 hours and then potassium hydroxide (0.17 g) was added to the mixture. The mixture was then heated to reflux and water was removed using a Dean-Stark trap. When the reaction temperature reached 120° C. and the removal of water was complete, the mixture was cooled to less than 40° C. Chlorodimethylvinylsilane (0.37 g) was added to the mixture and mixing was continued at room temperature for 1 hour. The mixture was filtered to give a solution of an organopolysiloxane resin in toluene. Resin Solution A and Resin Solution B, discussed above, were prepared by adjusting the volume of the solution to achieve the specified concentrations. The resin concentration of a solution was determined by measuring the weight loss after drying a sample (2.0 g) of the solution in an oven at 150° C. for 1.5 hours.

Example 2

This example describes the preparation of 1,4-bis(dimethylsilyl)benzene. Magnesium (84 g) and tetrahydrofuran (406 g) were combined under nitrogen in a 5-L three-necked flask equipped with a mechanical stirrer, condenser, two addition funnels, and thermometer. 1,2-dibromoethane (10 g) was added to the mixture and the contents of the flask were heated to 50 to 60° C. Tetrahydrofuran (THF, 200 mL) and a solution of 1,2-dibromobenzene (270 g) in THF (526 g) were sequentially added to the mixture, the latter in a drop-wise manner. After about twenty minutes, heating was discontinued and the remainder of the 1,2-dibromobenzene was added over a period of about 1.5 hours at such a rate as to maintain a gentle reflux. During the addition, THF was periodically added to maintain a reaction temperature less than about 65° C. After the addition of the 1,2-dibromobenzene was complete, THF (500 mL) was added to the flask and the mixture was heated at 65° C. for 5 hours. Heating was discontinued and the reaction mixture was stirred at room temperature overnight under nitrogen.

THF (500 mL) was added to the mixture and the flask was placed in an ice water bath. A dry-ice condenser was inserted into the top of the water condenser and chlorodimethylsilane (440 g) was added drop-wise to the mixture at such a rate as to maintain reflux. After the addition was complete, the flask was removed from the ice water bath and the mixture was heated at 60° C. overnight. The mixture was cooled to room temperature and treated sequentially with toluene (1000 mL) and saturated aqueous NH$_4$Cl (1500 mL). The contents of the flask were transferred to a separatory funnel and washed with several portions of water until a substantially transparent organic layer was obtained. The organic layer was removed, dried over magnesium sulfate, and concentrated by distillation until the temperature of the residue reached 150° C. The concentrated crude product was purified by vacuum distillation. A fraction was collected at 125–159° C. under a pressure of 12 mmHg (1600 Pa) to give p-bis (dimethylsilyl) benzene (140 g) as a colorless liquid. The identity of the product was confirmed by GC-MS, FT-IR, $^1$H NMR, and $^{13}$C NMR.

Example 3

Resin Solution A (53.8 parts), Crosslinking Agent A (9.5 parts), and Filler (31.3 parts) were blended in a Ross rotor/stator mixer until the Filler became uniformly distributed in the mixture. Catalyst (0.5 part) was added to the mixture and mixing was continued for about 2 minutes. The mechanical and thermal properties of the cured silicone product are shown in Table 1.

Example 4

A silicone composition was prepared using the method of Example 3, except 52.1 parts of Filler was used. The mechanical and thermal properties of the cured silicone product are shown in Table 1.

Example 5

A silicone composition was prepared using the method of Example 3 and the following concentrations of components: 37.7 parts of Resin Solution A, 6.7 parts of Crosslinking Agent A, 84 parts of Filler, and 0.35 part of Catalyst. The mechanical and thermal properties of the cured silicone product are shown in Table 1.

Example 6

Resin Solution A (53.8 parts) and Crosslinking Agent A (9.5 parts) were combined in a round-bottom flask and most of the toluene was removed by rotary evaporation at a temperature of 65° C. under a pressure less than about 5 mmHg (667 Pa). The mixture was analyzed by $^{29}$Si NMR to determine the mole ratio of silicon-bonded hydrogen atoms to vinyl groups. Crosslinking Agent A was then added to the mixture in an amount sufficient to replace the material lost during solvent removal. The mixture and Filler (52.1 parts) were blended in a Ross rotor/stator mixer until the Filler became uniformly distributed in the mixture. Catalyst (0.5 part) was added to the mixture and mixing was continued for about 2 minutes. The mechanical and thermal properties of the cured silicone product are shown in Table 1.

Comparative Example 1

Resin Solution B (100 parts) and Crosslinking Agent A (16.7 parts) were combined in a round-bottom flask to achieve a molar ratio of silicon-bonded hydrogen atoms to vinyl groups of 1.1:1. Most of the toluene was removed by rotary evaporation at a temperature of 65° C. under a pressure less than about 5 mmHg (667 Pa. The mixture was analyzed by $^{29}$Si NMR to determine the mole ratio of silicon-bonded hydrogen atoms to vinyl groups. Crosslinking Agent A was then added to the mixture in an amount sufficient to replace the material lost during solvent removal. The residual toluene content was determined to be less than about 0.3% as determined using head-space gas chromatography. The substantially solventless silicone solution has a room temperature viscosity of about 7 poise (7,000 mPa·s) at 25° C. Catalyst (0.5 part) was added to the mixture and mixing was continued for about two minutes. The mechanical and thermal properties of the cured silicone product are shown in Table 1.

Comparative Example 2

Resin Solution A (50.0 parts) and Crosslinking Agent B (10.6 parts) were blended in a Ross rotor/stator mixer until homogeneous. Catalyst (0.5 part) was added to the mixture and mixing was continued for about two minutes. The mechanical and thermal properties of the cured silicone product are shown in Table 1.

Comparative Example 3

Resin Solution A (50.0 parts), Crosslinking Agent B (10.6 parts), and Filler (118.0 parts) were blended in a Ross rotor/stator mixer until the Filler became uniformly distributed in the mixture. Catalyst (0.5 part) was added to the mixture and mixing was continued for about two minutes. The mechanical and thermal properties of the cured silicone product could not be measured due to shattering of the test specimens during curing, a consequence of very low fracture toughness.

TABLE 1

| Example | Flexural Modulus (Gpa) | Flexural Strength (MPa) | Fracture Toughness (MPam$^{1/2}$) | Tg (° C.) | CTE (μm/m/° C.) |
| --- | --- | --- | --- | --- | --- |
| 3 | 2.70 | 63.3 | 0.865 | 99 | 108.3 |
| 4 | 3.47 | 56.4 | 0.89 | 97 | 97.9 |
| 5 | 6.18 | 73.2 | 1.03 | 86 | 49.2 |
| 6 | 2.65 | 65.7 | 0.923 | 101 | 107.4 |
| Comp. 1 | 1.49 | 47.5 | 1.08 | 89 | 142.6 |
| Comp. 2 | 1.08 | 23.1 | 0.33 | 65 | 163.4 |
| Comp. 3 | * | * | * | * | * |

* Denotes a value not measurable due to shattering (fracture) of test specimens during curing.

That which is claimed is:

1. A silicone resin composition, comprising:
   (A) 100 parts by weight of an organopolysiloxane resin containing an average of greater than two alkenyl groups per molecule and having less than 1.5 mol % of silicon-bonded hydroxy groups, wherein the resin is selected from:
   (a) a copolymer consisting essentially of $R^2_3SiO_{1/2}$ units and $R^1SiO_{3/2}$ units, wherein the mole ratio of $R^2_3SiO_{1/2}$ units to $R^1SiO_{3/2}$ is from 0.05 to 3.0,
   (b) a copolymer consisting essentially of $R^2_3SiO_{1/2}$ units, $R^1SiO_{3/2}$ units, and $SiO_{4/2}$ units, wherein the mole ratio of $R^2_3SiO_{1/2}$ units to $R^1SiO_{3/2}$ is from 0.05 to 3.0 and the mole ratio of $R^2_3SiO_{1/2}$ and $R^1SiO_{3/2}$ units combined to $SiO_{4/2}$ units is from 4 to 99,
   (c) a copolymer consisting essentially of $R^2_3SiO_{1/2}$ units, $R^1SiO_{3/2}$ units, and $R^2_2SiO_{2/2}$ units, wherein the mole ratio of $R^2_3SiO_{1/2}$ units to $R^1SiO_{3/2}$ units is from 0.05 to 3.0 and the mole ratio of $R^2{}_3SiO_{1/2}$ units and $R^1SiO_{3/2}$ units combined to $R^2{}_2SiO_{2/2}$ units is from 0.5 to 99; and (d) a copolymer consisting essentially of $R^2{}_2SiO_{2/2}$ units and $R^1SiO_{3/2}$ units, wherein the mole ratio of $R^2{}_2SiO_{2/2}$ units to $R^1SiO_{3/2}$ units is from 0.2 to 4.0; wherein $R^1$ is a hydrocarbyl group free of aliphatic unsaturation and $R^2$ is selected from $R^1$ and alkenyl;

(B) an organohydrogensilane in an amount sufficient to cure the composition, the organohydrogensilane having the formula:

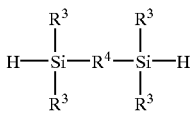

wherein $R^3$ is a hydrocarbyl group free of aliphatic unsaturation and $R^4$ is a hydrocarbylene group having a formula selected from:

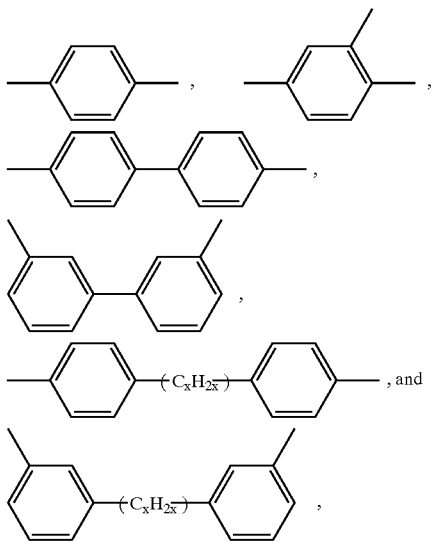

wherein x is from 1 to 6;

(C) an effective amount of an inorganic filler; and (D) a catalytic amount of a hydrosilylation catalyst.

2. The silicone composition according to claim 1, wherein the organopolysiloxane is a copolymer consisting essentially of $R^2{}_3SiO_{1/2}$ units and $R^1SiO_{3/2}$ units, wherein the mole ratio of $R^2{}_3SiO_{1/2}$ units to $R^1SiO_{3/2}$ is from 0.05 to 3.0, $R^1$ is a hydrocarbyl group free of aliphatic unsaturation, and $R^2$ is selected from $R^1$ and alkenyl.

3. The silicone composition according to claim 2, wherein the copolymer consists essentially of $ViMe_2SiO_{1/2}$ units and $PhSiO_{3/2}$ units, wherein Vi is vinyl and Me is methyl.

4. The silicone composition according to claim 1, wherein $R^4$ in component (B) is a hydrocarbylene group having the formula:

5. The silicone composition according to claim 4, wherein the organohydrogensilane has the formula:

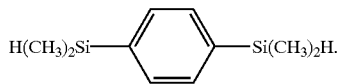

6. The silicone composition according to claim 1, wherein the concentration of component (B) is sufficient to provide from 0.8 to 1.8 silicon-bonded hydrogen atoms per alkenyl group in component (A).

7. The silicone composition according to claim 1, wherein the inorganic filler has a specific surface area of from 0.1 to 50 m$^2$/g.

8. The silicone composition according to claim 1, wherein the inorganic filler comprises particles having an average size of from 0.1 to 100 $\mu$m.

9. The silicone composition according to claim 1, wherein the inorganic filler has a pH value of from 6 to 9.

10. The silicone composition according to claim 1, wherein the inorganic filler is fused silica.

11. The silicone composition according to claim 1, wherein the inorganic filler is a treated inorganic filler.

12. The silicone composition according to claim 1, wherein the concentration of component (C) is such that the silicone composition cures to form a cured silicone product having a coefficient of thermal expansion of from $30 \times 10^{-6}$ to $90 \times 10^{-6}$ $\mu$m/m/°C. between −150 and 150° C.

13. The silicone composition according to claim 1, wherein the concentration of component (C) is from 40 to 400 parts by weight per 100 parts by weight of component (A).

14. The silicone composition according to claim 1, wherein the hydrosilylation catalyst comprises platinum.

15. The silicone composition according to claim 1, further comprising a hydrosilylation catalyst inhibitor.

16. A cured silicone product comprising a reaction product of the composition of claim 1.

17. A cured silicone product comprising a reaction product of the composition of claim 2.

18. A cured silicone product comprising a reaction product of the composition of claim 4.

19. A cured silicone product comprising a reaction product of the composition of claim 10.

20. A multi-part silicone resin composition, comprising:

(A) 100 parts by weight of an organopolysiloxane resin containing an average of greater than two alkenyl groups per molecule and having less than 1.5 mol % of silicon-bonded hydroxy groups, wherein the resin is selected from:

(a) a copolymer consisting essentially of $R^2{}_3SiO_{1/2}$ units and $R^1SiO_{3/2}$ units, wherein the mole ratio of $R^2{}_3SiO_{1/2}$ units to $R^1SiO_{3/2}$ is from 0.05 to 3.0, (b) a copolymer consisting essentially of $R^2{}_3SiO_{1/2}$ units, $R^1SiO_{3/2}$ units, and $SiO_{4/2}$ units, wherein the mole ratio of $R^2{}_3SiO_{1/2}$ units to $R^1SiO_{3/2}$ is from 0.05 to 3.0 and the mole ratio of $R^2{}_3SiO_{1/2}$ and $R^1SiO_{3/2}$ units combined to $SiO_{4/2}$ units is from 4 to 99, (c) a copolymer consisting essentially of $R^2{}_3SiO_{1/2}$ units, $R^1SiO_{3/2}$ units, and $R^2{}_2SiO_{2/2}$ units, wherein the mole ratio of $R^2{}_3SiO_{1/2}$ units to $R^1SiO_{3/2}$ units is from 0.05 to 3.0 and the mole ratio of $R^2{}_3SiO_{1/2}$ units and $R^1SiO_{3/2}$ units combined to $R^2{}_2SiO_{2/2}$ units is from 0.5 to 99; and (d) a copolymer consisting essentially of $R^2{}_2SiO_{2/2}$ units and $R^1SiO_{3/2}$ units, wherein the mole ratio of $R^2{}_2SiO_{2/2}$ units to $R^1SiO_{3/2}$ units is from 0.2 to 4.0; wherein $R^1$ is a hydrocarbyl group free of aliphatic unsaturation and $R^2$ is selected from $R^1$ and alkenyl;

(B) an organohydrogensilane in an amount sufficient to cure the composition, the organohydrogensilane having the formula:

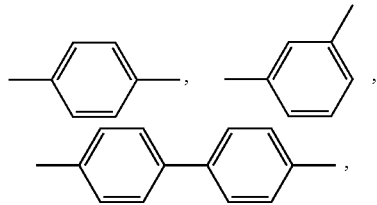

wherein $R^3$ is a hydrocarbyl group free of aliphatic unsaturation and $R^4$ is a hydrocarbylene group having a formula selected from:

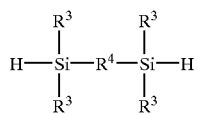

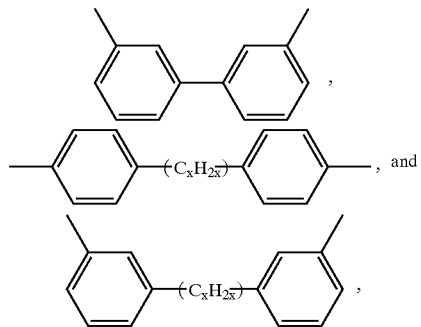

wherein x is from 1 to 6;

(C) an effective amount of an inorganic filler; and (D) a catalytic amount of a hydrosilylation catalyst; provided components (A), (B), and (D) are not present in the same part.

* * * * *